(12) United States Patent
Meister et al.

(10) Patent No.: US 6,798,334 B1
(45) Date of Patent: Sep. 28, 2004

(54) METHOD AND DEVICE FOR VERIFYING A BIOMETRIC CHARACTERISTIC

(75) Inventors: Gisela Meister, Munich (DE); Albert Mödl, Gersthofen (DE); Robert Müller, München (DE); Bruno Struif, Darmstadt (DE); Dirk Scheuermann, Darmstadt (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 09/623,493
(22) PCT Filed: Mar. 15, 1999
(86) PCT No.: PCT/EP99/01691
§ 371 (c)(1), (2), (4) Date: Feb. 28, 2001
(87) PCT Pub. No.: WO99/48056
PCT Pub. Date: Sep. 23, 1999

(30) Foreign Application Priority Data

Mar. 16, 1998 (DE) ......................................... 198 11 332

(51) Int. Cl.$^7$ ............................. G05B 19/00; G06F 7/00; G08B 29/00; H04B 1/00; H04Q 9/00
(52) U.S. Cl. ..................................... 340/5.52; 340/5.53
(58) Field of Search ................................ 382/124–127, 382/5; 356/71; 340/5.5, 5.53, 5.83

(56) References Cited

U.S. PATENT DOCUMENTS

| 4,947,442 A | * | 8/1990 | Tanaka et al. | 382/125 |
| 5,055,658 A | * | 10/1991 | Cockburn | 235/382 |
| 5,559,504 A | * | 9/1996 | Itsumi et al. | 340/5.53 |
| 5,815,252 A | * | 9/1998 | Price-Francis | 356/71 |
| 5,959,541 A | * | 9/1999 | DiMaria et al. | 340/5.52 |
| 6,219,793 B1 | * | 4/2001 | Li et al. | 713/202 |
| 6,480,617 B2 | * | 11/2002 | Kovacs-Vajna | 382/125 |

FOREIGN PATENT DOCUMENTS

| DE | 4231913 | 1/1994 |
| DE | 19515123 | 8/1996 |
| DE | 19648767 | 6/1997 |
| EP | 0864996 | 9/1998 |
| GB | 2171828 | 9/1986 |
| GB | 2237670 | 5/1991 |
| WO | 98/01820 | 1/1998 |

\* cited by examiner

Primary Examiner—Michael Horabik
Assistant Examiner—Nam Nguyen
(74) Attorney, Agent, or Firm—Bacon & Thomas, PLLC

(57) ABSTRACT

A method and an apparatus for testing a biometric feature wherein a set value of the biometric feature is stored in a data carrier in the form of one or more data records. For testing the biometric feature, measured values representing an instantaneous value of the biometric feature are first determined and made available in a terminal. The data carrier transmits to the terminal at least a subset of first reference values depending on the data record or data records for the set value. The terminal links data derived from the measured values with the subset of first reference values and transmits the result of the link to the data carrier. The data carrier tests the result of the link and determines therefrom whether the biometric feature is authentic.

11 Claims, 5 Drawing Sheets

```
 Terminal                          Chip Card

A: refdato, extr 1, extr 2
                           store
                        B: refdata 1, refdata 2
                           store Measuring data record sens
   verdata = calc (sens)
                                    A: refdata 1 = extr 1 (refdata)

refdata 1
                   <------------------- verdata 2 = f (verdata, refdata 1)
                       verdata 2
                   -------------------->

A: refdata 2 = extr 2 (refdata)
                                    A+B: verify (verdata 2, refdata 2)
```

| 1 | 2 | 3 | .... | n |
| x1 | x2 | x3 | .... | xn |
| y1 | y2 | y3 | .... | yn |
| z1 | z1 | z3 | .... | zn |

FIG. 7

| Terminal | | Data Carrier |
|---|---|---|
| | | $T, Ty$ and $D$ store |

---

Measuring data record sens
 $x = \text{calc}(\text{sens})$ $$\xleftarrow{\quad T \quad}$$

$Tx$ $$\xrightarrow{\quad Tx \quad}$$

$$\|z\|^2 = \sum_{i=1}^{n} d_{ii} \, (Tx - Ty)_i^2$$

METHOD AND DEVICE FOR VERIFYING A BIOMETRIC CHARACTERISTIC

BACKGROUND OF THE INVENTION

1. Field of the Invention

This invention relates to a method and an apparatus for testing a biometric feature.

2. Description of Related Art

Biometric features are used for, among other things, identifying or verifying entitled persons in connection with access controls and the performing of monetary transactions. With the aid of biometric features one can ensure for example that a data carrier, such as a smart card, to be used for the abovementioned controls or transactions can be used only by the entitled person, i.e. only the entitled person is granted access or can perform the transaction. For this purpose a biometric feature such as a fingerprint, voice sample or design of the eyeground, etc., is detected by measuring technology before the data carrier is enabled for use, and only in the case of a positive comparison of the measured values with reference values stored on the data carrier is the access or transaction with the data carrier enabled. The data carrier is normally used in connection with a terminal with which the data carrier communicates. Comparison of the biometric data detected by measuring technology with stored reference values can fundamentally be effected both in the data carrier and in the terminal. Since biometric measuring data are frequently very extensive, and the evaluation of such data also involves complex arithmetic operations, one requires high computing power and a lot of storage space. These requirements cannot, or not readily, be met by data carriers available today, so that the evaluation of biometric measuring data is normally performed in the terminal and the data carrier serves only to store the reference values.

Such a terminal is known from DE 44 39 593 C2. This document discloses an access control apparatus having a microphone for speech recognition and a reading device for smart cards. A speech sample is taken using the microphone and reduced to typical speech parameters in a speech analysis unit. The speech parameters are compared in an evaluation unit with reference values stored on the smart card and transferred from the smart card to the access control device for the purpose of comparison. A disadvantage of this known device is that the reference values stored on the smart card are transmitted outside so that there is a danger of unauthorized third parties gaining knowledge of said reference values.

It is further known from DE 44 39 593 C2 that the access control apparatus passes speech parameters determined from a speech sample to the smart card and the smart card compares the transmitted speech parameters with stored reference values. This procedure has the advantage that the stored reference values do not leave the smart card so there is no danger of unauthorized third parties intercepting them. However, since the measured values for the speech parameters rather than the reference values for the speech parameters must now be transferred between the device and the smart card, there is a danger of the measured values rather than the reference values being intercepted by an unauthorized third party. If an unauthorized third party has knowledge of the authorized user's measured values, this is just as serious as if he has knowledge of the reference values.

SUMMARY OF THE INVENTION

The invention is based on the problem of stating a method and an apparatus for testing a biometric feature which offers a very high security standard while being realizable with tolerable effort.

To ensure optimal protection from unauthorized use of the data carrier, it is necessary for the testing of the biometric feature to be performed by the data carrier itself and not by the terminal with which the data carrier communicates in the course of its proper use. There is a problem, however, insofar as the sensor or sensors for detecting the biometric feature are normally mounted on the terminal so that the measured values must be transferred from the terminal to the data carrier. A further problem is that the computing and storage capacities of currently used data carriers, e.g. smart cards, usually do not suffice for performing a reliable comparison with reference values starting from the measured values of the biometric feature within an acceptable time.

The invention solves these problems in that, firstly, all security-relevant operations are performed within the data carrier and computing-intensive operations are swapped out unless security is impaired, and, secondly, the data carrier specifies which data are transmitted from the terminal to the data carrier in which form in this swap. Instead of sending the complete set of measured values to the data carrier each time, the terminal performs a pre-evaluation of the measured values, thereby also performing a link between temporary results obtained from the measured values and data transmitted to the terminal from the data carrier. Only the result of this link is then transmitted from the terminal to the data carrier, which can then ascertain with relatively little effort from these link results whether the biometric feature detected by measuring technology comes from an authorized user.

Swapping computing-intensive and security-irrelevant operations from the data carrier to the terminal thus has the advantage that most of the computing effort occurs in the terminal, which can be accordingly equipped therefor, and only a fraction is left for the data carrier itself, without lowering the security standard. Further, the link of measured values with data of the data carrier before transfer from the terminal to the data carrier has the advantage of essentially impeding attempts at manipulation by means of intercepted data. For example, the data carrier can systematically or randomly vary its specifications for the link, thereby preventing manipulation by rerecording the intercepted link results. In particular, the data carrier can also select a varying subset of the pre-evaluated measured values so that a potential attacker could always gain knowledge of only part of the measured values, and possibly furthermore does not know which particular part was selected by the data carrier.

To better illustrate the invention, it will be explained in the following with reference to the biometric feature "fingerprint" for a system comprising a smart card and a terminal. The described example is only one of many possible realizations. The invention can be used just as well for any other biometric features, such as speech, eyeground, etc. Furthermore, the details of realization, e.g. which characteristics of the biometric feature are selected and how these characteristics are represented and evaluated, can vary within wide limits.

According to the inventive method a fingerprint is first detected by measuring technology and the characteristics of the fingerprint determined from the measured values by a suitable extraction function. The characteristics can consist for example of coordinates and the kind of minutiae of the fingerprint. The minutiae are characteristic points or shapes, etc., of the fingerprint lines, such as branchings or end points thereof. The smart card specifies to the terminal e.g. the coordinates of the minutiae determined from the measured values for which the kinds of minutiae are to be evaluated. The terminal thereupon links the specified coordinates with the minutiae data material determined from the measured values, determines therefrom the kind of minutiae determined at the specified coordinates, and passes the result to the smart card. The smart card tests the transmitted minutiae data and ascertains whether the biometric feature comes from an authorized user. This test can be done for example by comparison with reference values previously stored on the smart card.

Advantageous designs and developments of the invention will be described in the following with reference to the embodiments shown in the drawing, in which:

BRIEF DESCRIPTION OF THE DRAWINGS

FIG. 7 shows a representation of the inventive method with the aid of vectors and matrices.

DETAILED DESCRIPTION OF THE INVENTION

Figure 1:
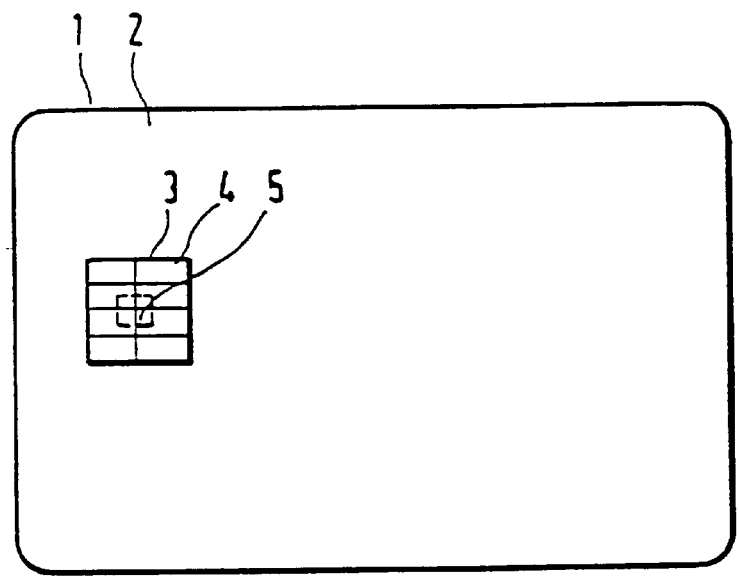
FIG. 1 shows a smart card in a top view.

FIG. 1 shows smart card 1 as an example of a data carrier in a top view. Smart card 1 consists of card body 2 and chip module 3 disposed in a gap in card body 2. Chip module 3 consists of contact bank 4 and integrated circuit 5 disposed below contact bank 4. The dimensions of smart card 1 are fixed by ISO standard 7810 and the mode of functioning of integrated circuit 5 is compatible with ISO standard 7816. Smart card 1 can be provided for example as an identity card for access to a building or as an entitlement card for access to an electric device, for example a computer. Further, smart card 1 can be a bank card, credit card, check card or the like to be used for performing monetary transactions.

Alongside standardized smart card 1 shown in FIG. 1, the invention can also be used in conjunction with other smart cards or any other data carriers capable of storing data.

Figure 2:
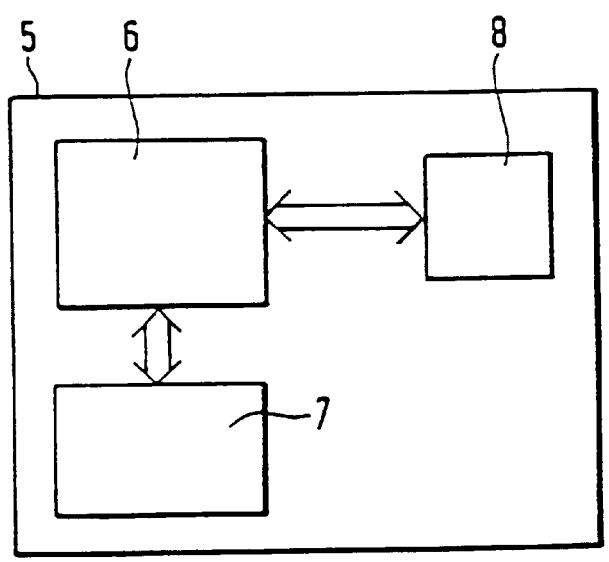
FIG. 2 shows a block diagram of the integrated circuit of the smart card from FIG. 1.

FIG. 2 shows a block diagram of integrated circuit 5 of smart card 1 shown in FIG. 1. Integrated circuit 5 is a microprocessor capable of performing calculations independently. Integrated circuit 5 consists of central processing unit 6, memory 7 and input-output unit 8. Central processing unit 6 is connected both with memory 7 and with input-output unit 8 for the purpose of data exchange. Central processing unit 6 controls the mode of functioning of integrated circuit 5, thereby normally utilizing commands stored in memory 7. Memory 7 can be executed as a non-volatile memory, normally ROM or EEPROM, or as a volatile memory, RAM. Normally both a volatile and a non-volatile memory are present simultaneously. The commands executed by central processing unit 6 are normally stored in the ROM, partly also in the EEPROM. The EEPROM moreover contains the reference values for the PIN or biometric feature and further data required for the application. The RAM serves as a working memory for temporarily storing data required at the moment.

Data exchange between integrated circuit 5 and the outside world is effected via input-output unit 8, which is for example a serial interface and is electrically connected with the contact of contact bank 4 provided for data input/output. It is not absolutely necessary for the inventive method that the data exchange between integrated circuit 5 and the outside world be effected via contact bank 4. One can instead use a noncontact smart card by which data exchange is effected not via contact bank 4 but for example via an antenna coil or electric coupling surfaces.

Although not explicitly shown in FIG. 1, smart card 1 can have a fingerprint sensor for detecting the fingerprint by measuring technology. This sensor would then be mounted at a suitable place on card body 2. Normally the fingerprint sensor will be mounted on the terminal, as shown in FIG. 3, however, since fingerprint sensors suitable for integration in smart cards 1 are not yet, or not yet readily, available at present.

Figure 3:
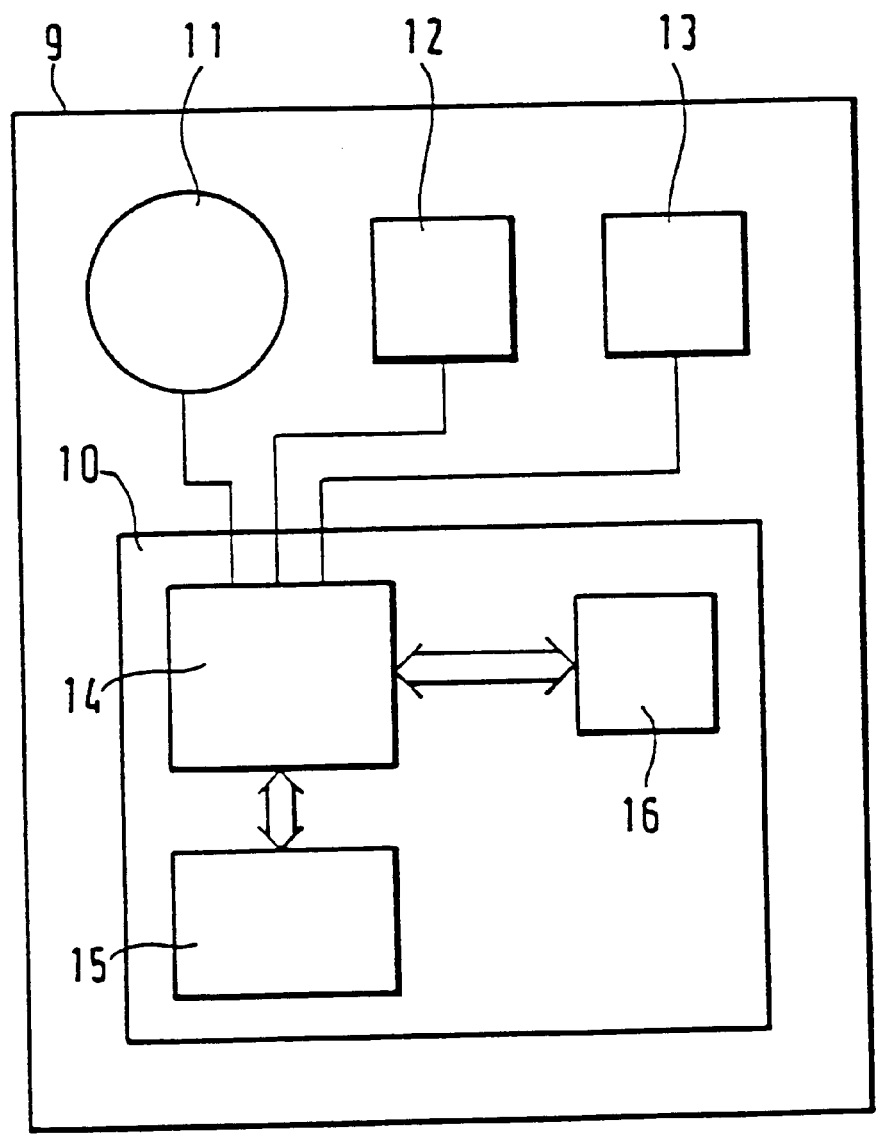
FIG. 3 shows a block diagram of a terminal.

FIG. 3 shows a block diagram of terminal 9 with which smart card 1 enters into data exchange. Terminal 9 has integrated circuit 10 and fingerprint sensor 11, keyboard 12 and display 13. Fingerprint sensor 11 can be omitted in the variant of the invention in which the smart card has a fingerprint sensor of its own. Integrated circuit 10 of terminal 9 has, like integrated circuit 5 of smart card 1, central processing unit 14 connected with memory 15 and input-output unit 16. Further, central processing unit 14 is connected with fingerprint sensor 11, keyboard 12 and display 13.

Fingerprint sensor 11 is used to detect a fingerprint of the user by measuring technology. The thus determined data can then be processed in central processing unit 14 and the result of said processing transmitted via input-output unit 16 to corresponding input-output unit 8 of integrated circuit 5 of smart card 1. Central processing unit 14 can also receive data from integrated circuit 5 of smart card 1 via input-output units 8 and 16. Via keyboard 12 the user can manually enter data required for the particular application. Which data input is necessary in the particular case can be indicated on display 13.

In order to prevent improper use of smart card 1 by an unauthorized third party, for example if smart card 1 is lost or stolen, the use of smart card 1 is only possible after positive identification or verification of a biometric feature of the user, the fingerprint in the following example. Identification via a biometric feature replaces or supplements authentication of the user by entry of a secret personal identification number (PIN) as is customary with smart cards 1. A reference value for said identification number is stored in memory 7 of integrated circuit 5 so as to be inaccessible from outside, and is compared with the entered identification number. Analogously, reference values for the biometric feature are stored in memory 7 of integrated circuit 5 according to the invention which are utilized upon testing of the measured values. If the PIN comparison or test of the biometric feature turns out positive, smart card 1 is enabled for use. Otherwise a certain number of further attempts is normally permitted and if these attempts also fail the smart card is disabled.

Figures 4, 5:
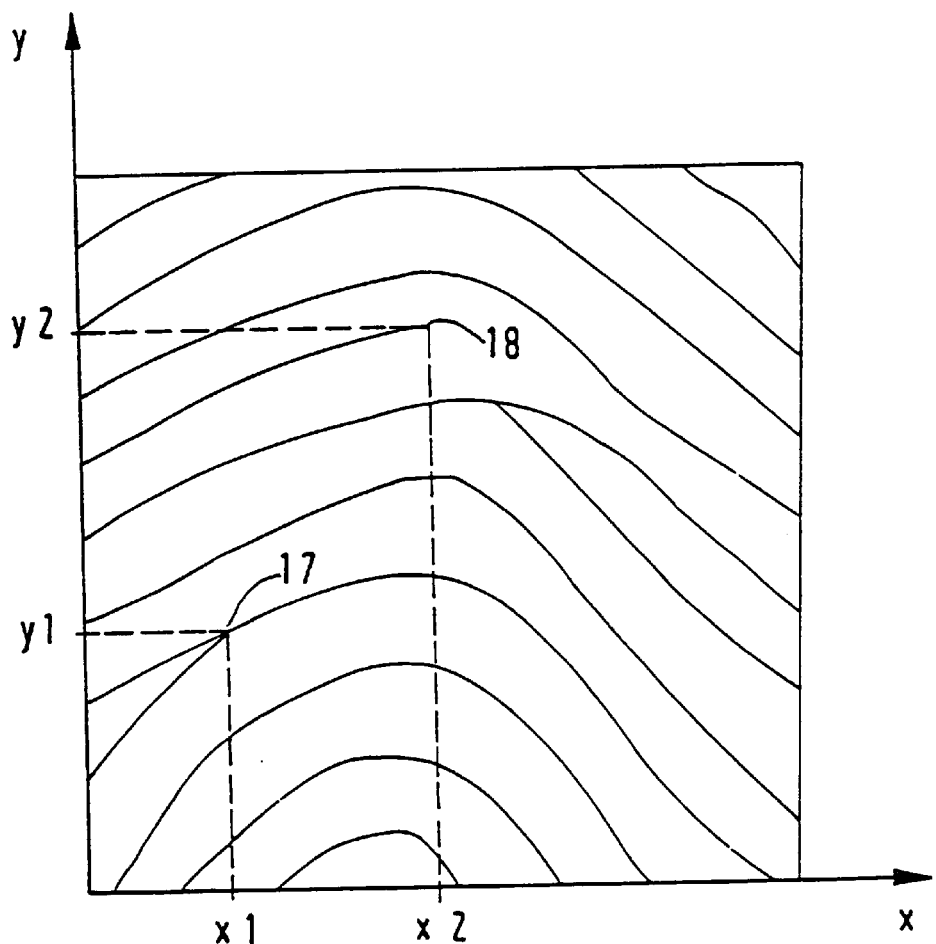
FIG. 4 shows a greatly enlarged detail of a fingerprint.
FIG. 5 shows a data record for the characteristics of a fingerprint.

FIG. 4 shows a greatly enlarged detail of a fingerprint. The fingerprint is composed of a series of more or less curved lines extending as continuous lines, branching or having an end point within the shown detail. For the fingerprint test one can use for example the coordinates of the branchings and the end points as characteristics to be tested since such a data record constitutes an individual feature of the person having the fingerprint. For determining the coordinates of the fingerprint characteristics, the detail of the fingerprint shown in FIG. 4 was provided with a system of coordinates, and coordinates x1 and y1 of line branching 17 and coordinates x2 and y2 of end point 18 drawn in by way of example. A complete data record for a fingerprint consists of a whole series of such coordinate pairs, also including the kind of characteristic (branching, end point, optionally others). The structure of such a data record is shown in FIG. 5.

FIG. 5 shows a possible structure of data record refdata representing the characteristics of a fingerprint. The first line of the matrix shown in FIG. 5 states the running number of the individual coordinate pairs. The second and third lines specify the x- and y-coordinates for fixing the positions of the fingerprint characteristics. The fourth line states by value z the kind of fingerprint characteristic for the individual coordinate pairs, i.e. whether it is a branching or end point, etc. The data record consists of altogether n entries, each entry comprising four values (running number, x-coordinate, y-coordinate, kind of characteristic).

Figure 6:
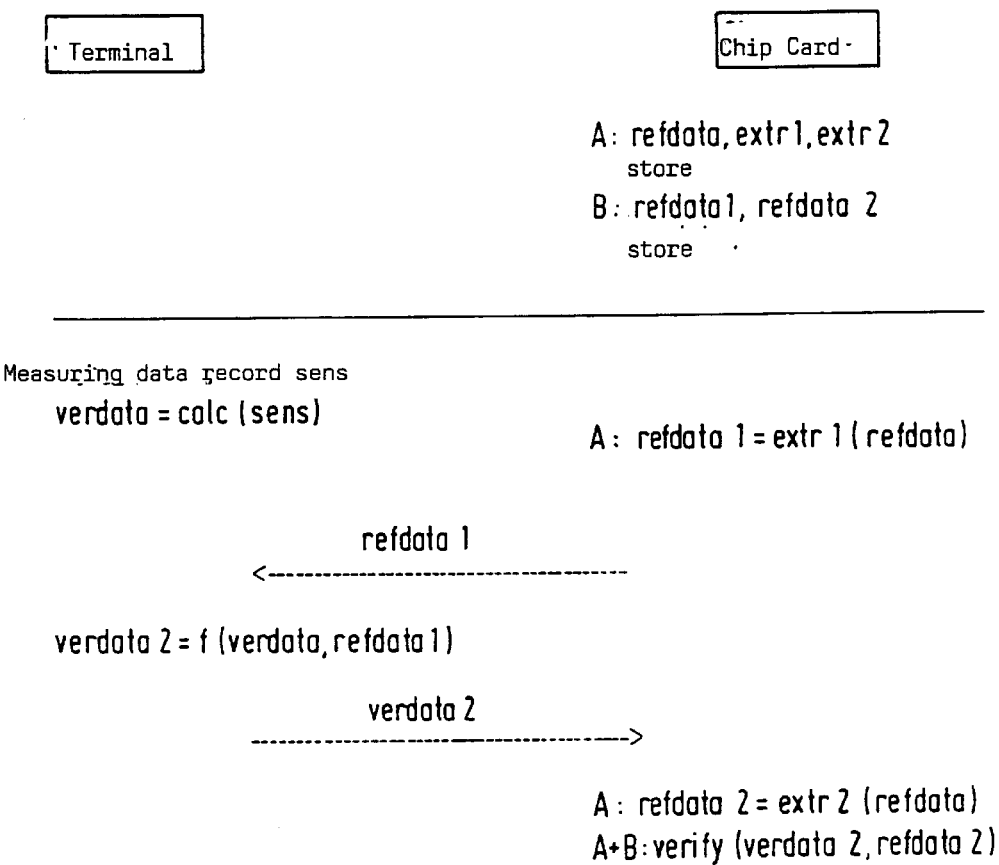
FIG. 6 shows a representation of the run of the inventive method.

FIG. 6 shows the inventive method for testing a fingerprint. The left side of FIG. 6 shows the method steps performed in terminal 9, and the right side the method steps performed in the data carrier and thus in smart card 1 in the present example. The arrows between the left and right sides of FIG. 6 indicate data transport between terminal 9 and smart card 1.

Prior to the inventive test method, for example during personalization of smart card 1 by the card issuer, a number of data and mathematical functions required for carrying out the method are stored in smart card 1. As described in detail below, it depends on the embodiment of the invention which data are specifically required. Method steps specific to an embodiment are marked in FIG. 6 by letter A for a first embodiment and letter B for a second embodiment.

The actual test method begins with detection of the card owner's fingerprint by terminal 9. This requires the card owner to place a finger, for example the index finger, on fingerprint sensor 11 of terminal 9. The division between initialization and the test in the narrower sense is illustrated by a horizontal line in FIG. 6. The measured values of the fingerprint determined during fingerprint detection are represented by data record sens. The format and exact appearance of data record sens plays no part for the further consideration. It is only important that terminal 9 has function calc for determining from measuring data record sens data record verdata corresponding in structure to data record refdata. That is, data record verdata notes the coordinates and kind of characteristics of the fingerprint for the currently measured fingerprint.

In a next step, smart card 1 transmits data record refdata1 to the terminal. Data record refdata1, like data record refdata2, was previously determined from data record refdata by applying extraction function extr1 or extr2 to data record refdata. The storage of refdata1 and refdata2, but in particular refdata, will usually be done in encrypted form. With respect to the details for determining data records refdata1 and refdata2 one must distinguish between two embodiments of the invention.

According to a first embodiment (letter A), data record refdata whose format is shown in FIG. 5 is stored completely in smart card 1. This data record was for example previously generated by the card issuer from measuring data of the future card owner's fingerprint and stored in memory 7 of smart card 1. Extraction functions extr1 and extr2 are applied to data record refdata whenever data record refdata1 or refdata2 is required and not already available. In the case of the described example of a fingerprint test with reference to characteristics of the fingerprint, data record refdata 1 describes the coordinates x and y of the fingerprint characteristics which are to be tested. Data record refdata2 describes the kind of characteristics for the individual coordinates. In other words, data record refdata1 has lines 1 to 3 of data record refdata shown in FIG. 5, and data record refdata2 lines 1 and 4. It should be pointed out in particular that data record refdata1 and as a result also data record refdata2 normally do not comprise all running numbers of data record refdata, i.e. data records refdata1 and refdata2 each represent only a subset of the individual fingerprint characteristics each provided with a running number in data record refdata. This is of great importance for the inventive method described in the following since data record refdata1 can be used to select which characteristics of the fingerprint are to be tested.

In a second embodiment (letter B) of the invention, data record refdata is not stored in smart card 1. Instead, only data records refdata1 and refdata2 derived therefrom are stored in memory 7 of smart card 1. However, stored data records refdata1 and refdata2 will in this case normally comprise all running numbers of data record refdata, and a particular subset for testing will then be selected from complete data records refdata1 and refdata2 only during fingerprint testing.

Data records refdata1 and refdata2 can thus be made available both by extraction and forming subsets from stored data record refdata according to the first embodiment and by forming subsets from stored data records refdata1 and refdata2 according to the second embodiment. In each case, data records refdata1 and refdata2 used for the further method are the subsets resulting by selection of certain running numbers and thus normally no longer data records having all running numbers.

For the present example the transmission of data record refdata1 from smart card 1 to terminal 9 means that smart card 1 informs terminal 9 of which coordinates the measured fingerprint is to be tested as to its characteristics for.

The selection by smart card 1 of characteristics to be tested can be made according to different criteria. One can thus attempt to select especially significant or clearly recognizable characteristics in the interests of most efficient and reliable testing. Further, one can vary the selection randomly or according to a secret system in order to prevent, or at least impede, abuse through interception of the transferred data by unauthorized third parties. Further, the selection can depend on the current application so that for example a smaller number of characteristics is selected in an application involving the transfer of only small amounts of money and thus a risk of lesser damage in the case of fraud, than in a case involving the transfer of larger amounts. The effort made can thus be adapted very well to the necessary security standard in the particular case. In order to impede an attack in general, it is of course also possible in all cases for data record refdata1 as well as further data transmitted between smart card 1 and terminal 9 to be transferred in encrypted form.

In terminal 9 transferred data record refdata1 is linked with data record verdata with the aid of function f, thereby generating data record verdata2. Speaking graphically, the kind of fingerprint characteristic is determined for each of the coordinate pairs transferred with data record refdata1. Thus determined data record verdata2 therefore states the particular kind of characteristic found for the given coordinates or a certain kind of coding saying that no characteristic could be determined for specific given coordinates, thus having lines 1 and 4 of the matrix from FIG. 5. Calculation of function f would not be possible, or only with considerable additional effort, in smart card 1 due to memory and/or time complexity since function f also contains a similarity method.

Subsequently data record verdata2 is transferred from terminal 9 to smart card 1. Smart card 1 tests data record verdata2 and the fingerprint is accepted as an authentic biometric feature or not in accordance with the result of this test. The test can involve for example a comparison of data record verdata2 determined from the measurement with reference data record refdata2. This comparison can be performed such that for each running number of reference data record refdata2 the kind of fingerprint characteristic is compared with the corresponding value of data record verdata2 determined from the measured values. The measured fingerprint can be accepted as authentic if, firstly, the number of characteristics found in data record verdata2 exceeds a presettable threshold value either absolutely or proportionally and, secondly, the agreement between data records verdata2 and refdata2 exceeds a further presettable threshold value. The necessary comparison operations can be performed with relatively little computing effort and storage space and thus be handled by smart card 1 without any problem. A great number of other evaluation methods can also be used. For example, evaluation of the number of characteristics found can be totally omitted and only the agreement between data records verdata2 and refdata2 tested, this test normally including the number of characteristics found insofar as a mismatch is ascertained for each characteristic not found.

Besides the described possibility of use in connection with fingerprint testing, the inventive method can also be used with other biometric features, for example for testing speech samples or measurements of the eyeground, etc.

The principle underlying the inventive method can be described in more general form with the aid of mathematical symbols. This description assumes that the biometric data, i.e. both measured values and reference values, exist in the form of vectors after a certain preprocessing. Said vectors are designated x (measured values) and y (reference values). In the inventive method it is determined on the basis of a comparison of vectors x and y whether the measured biometric feature is most probably authentic. A relatively simple possibility of comparison is to calculate the Euclidean distance. As an alternative to this method of comparison one can also form the norm over positive definite matrices and compare vector x of the measured values with vector y of the reference values in this way. For this purpose one first forms differential vector z from vectors x and y and then the norm of vector z according to the formula $$\|z\|^2 = z^T A z.$$

Matrix A serves to weight the individual components of differential vector z to different extents.

To permit work to be divided between the terminal and the data carrier according to the inventive method, matrix A is split into orthogonal matrix T and diagonal matrix D, so that the following applies:

$$A = T^T D T.$$

The square of the norm thus results as:

$$\|z\|^2 = z^T T^T D T z$$
$$= (Tz)^T D (Tz)$$
$$= (Tx - Ty)^T D (Tx - Ty)$$
$$= (Tx - Ty)^T D (Tx - Ty)$$
$$= \sum_{i=1}^{n} d_{ii}(Tx - Ty)_i^2$$

where $d_{ii}$ represents the diagonal elements of matrix D.

The inventive method is performed with consideration of this split by specifying matrix A for the weighting and vector y for the reference values. Orthogonal matrix T, the product of orthogonal matrix T and reference vector y, and diagonal matrix D are determined therefrom by suitable functions and stored in data carrier 1.

The procedure for testing the biometric feature is shown in FIG. 7. As in FIG. 6, the steps performed in terminal 9 are shown on the left and the steps performed in the data carrier on the right. The inventive method presupposes that matrices T and D and the product of matrix T and reference vector y were previously stored in data carrier 1. The actual test method begins with the biometric feature being detected by terminal 9. The result of this data acquisition is data record sens. Vector x of the measured values is determined from data record sens with the aid of suitable function calc. Subsequently, data carrier 1 transmits orthogonal matrix T to terminal 9. In terminal 9 the product of matrix T and vector x is formed and transmitted to data carrier 1. To calculate the norm of differential vector z data carrier 1 need only perform multiplications with a diagonal matrix, so that data carrier 1 need ultimately only perform n multiplications or squarings to calculate the norm of vector z with a square matrix of dimension n. If the norm of vector z were calculated directly and without transfer of orthogonal matrix T to terminal 9, $n^2$ multiplications would be necessary in the data carrier, i.e. the inventive method considerably reduces the computing effort in data carrier 1. With this general procedure all security-relevant operations are also performed in data carrier 1. Orthogonal matrix T transferred to terminal 9 depends on vector y of the reference data but does not suffice for reconstructing vector y. Diagonal matrix D critical in terms of security remains in data carrier 1.

What is claimed is:

1. A method for testing a biometric feature comprising the steps of:
    determining measured values representing an instantaneous value of the biometric feature and making said measured values available in a terminal;
    transmitting from a data carrier to the terminal at least a subset of first reference values depending on a previously fixed set value of the biometric feature;
    linking data derived from the measured values with the subset of first reference values in the terminal;
    transmitting the result of the link from the terminal to the data carrier; and
    testing the result of the link in the data carrier;
    wherein the first reference values are determined from a stored reference data record representing the set value of the biometric feature such that recalculation of the first reference values from the reference data record is not possible.

2. The method according to claim 1, wherein the measured values are determined with sensor means of the terminal.

3. The method according to claim 1, wherein the measured values are determined with a sensor device of the data carrier.

4. The method according to claim 1, wherein the first reference values and second reference values are determined in the data carrier from the stored reference data record.

5. The method according to claim 1, wherein the first reference values and second reference values are determined previously from the reference data record and stored in the data carrier.

6. The method according to claim 1, wherein a subset of first reference values is varied with the aid of a random variable.

7. The method according to claim 1, wherein a subset of first reference values is varied systematically according to a secret method.

8. The method according to claim 1, wherein a subset of first reference values depends on the transaction amount if the data carrier is used for financial transactions.

9. The method according to claim 1, wherein the result of the link of data derived from the measured values with a subset of first reference values is tested with the aid of second reference values stored in the data carrier.

10. A system for testing a biometric feature, said system comprising:

a data carrier;

a terminal arranged to move available measured values representing an instantaneous value of the biometric feature;

wherein the data carrier is arranged to transmit to the terminal at least a subset of first reference values depending on a previously fixed set value of the biometric feature, said first reference values being installed on the data carrier such that recalculation of the first reference values from a reference data record representing the set value of the biometric feature is not possible;

wherein the terminal is arranged to link data derived from the measured values with the subset of first reference values and is configured to transmit the result of the link to the data carrier; and wherein the data carrier is arranged to test the result of the link.

11. The system according to claim 10, wherein the data carrier is a smart card.

* * * * *